United States Patent [19]

Lasoen

[11] Patent Number: 5,138,895

[45] Date of Patent: Aug. 18, 1992

[54] TRANSMISSION RATIO SELECTOR MECHANISM

[75] Inventor: Jean J. Lasoen, Villepreux, France

[73] Assignee: Massey-Ferguson Services N.V., Netherlands

[21] Appl. No.: 202,760

[22] PCT Filed: Sep. 28, 1987

[86] PCT No.: PCT/EP87/00549

§ 371 Date: Jul. 5, 1989

§ 102(e) Date: Jul. 5, 1989

[87] PCT Pub. No.: WO88/02453

PCT Pub. Date: Apr. 7, 1988

[30] Foreign Application Priority Data

Oct. 3, 1986 [GB] United Kingdom ............ 8623856

[51] Int. Cl.⁵ .................... G05G 9/02; F16H 59/02
[52] U.S. Cl. ................................ 74/477; 74/473 R
[58] Field of Search ............ 192/48.7; 74/473 SW, 74/477, 473 R

[56] References Cited

U.S. PATENT DOCUMENTS

| | | | |
|---|---|---|---|
| 3,853,019 | 12/1974 | McAdams | 74/473 R |
| 4,290,318 | 9/1981 | Ookubo et al. | 74/477 |
| 4,307,624 | 12/1981 | Mylenek | 74/477 |
| 4,615,233 | 10/1986 | Lasoen | 74/473 R |
| 4,712,640 | 12/1987 | Leigh-Monstevens et al. | 74/473 R X |
| 4,757,726 | 7/1988 | Yamaguchi | 74/473 R |
| 4,784,009 | 11/1988 | Sakamoto et al. | 74/473 R X |
| 4,793,202 | 12/1988 | Okubo | 74/477 |
| 4,793,378 | 12/1988 | Loeffler et al. | 74/477 X |
| 4,799,399 | 1/1989 | Bruce | 74/477 |

FOREIGN PATENT DOCUMENTS

| | | | |
|---|---|---|---|
| 2055162 | 7/1980 | United Kingdom | 74/473 R |
| 2136516 | 7/1984 | United Kingdom | 74/473 R |

Primary Examiner—Allan D. Herrmann
Assistant Examiner—Julie Krolikowski
Attorney, Agent, or Firm—MacMillan, Sobanski & Todd

[57] ABSTRACT

A transmission ratio selector mechanism for a transmission having two ratio selector couplers both of which must be engaged to provide drive through the transmission. The selector mechanism includes a selector shaft which is rotatable about its longitudinal axis and also axially moveable parallel to its longitudinal axis. Rotation of the selector shaft is arranged to operate one of the couplers via a mechanical linkage including a twin-armed member and a pivoted lever while axial movement of the shaft operates the other coupler via a fluid pressure-operated actuator and an associated control valve mechanism. An interlock is provided to ensure that the fluid pressure-operated coupler is always engaged before the mechanically operated coupler. The interlock comprises a formation which is movable with the shaft and cooperates with a formation movable with the coupler which is to be engaged first.

5 Claims, 6 Drawing Sheets

| GEARS ENGAGED | RATIO SELECTED | | | |
|---|---|---|---|---|
| | $F_A$ | $F_B$ | $R_A$ | $R_B$ |
| | 12 | 10 | 10 | 12 |
| | 13 | 11 | 14 | 13 |
| | | | 15 | 15 |
| | | | 13 | 14 |
| | | | | 10 |
| | | | | 11 |

TRANSMISSION RATIO SELECTOR MECHANISM

TECHNICAL FIELD

This invention relates to transmission ratio selector mechanisms and in particular to such mechanisms for selecting the operative ratio in a transmission with two ratio selector couplers (for example synchromesh couplers) both of which must be engaged to provide drive through the transmission. An example of such a transmission is described and claimed in the Applicants's UK Patent No. 2055162.

DISCLOSURE OF THE INVENTION

It is an object of the present invention to provide an improved form of selector mechanism which is suitable for use in selecting the operative ratio of the above type of transmission.

Thus according to the present invention there is provided a transmission ratio selector mechanism for a transmission having two ratio selector couplers both of which must be engaged to provide drive through the transmission, said selector mechanism including a selector shaft which is rotatable about its longitudinal axis and also axially movable parallel to its longitudinal axis, said rotation of the shaft being arranged to operate one coupler and said axial movement of the shaft being arranged to operate the other coupler.

Preferably the selector mechanism includes interlock means to ensure that during any ratio change involving the engaging of both couplers a particular one of said couplers is always engaged before the other coupler.

The interlock means may include a formation on or movable with the shaft which co-operates with a formation movable with the coupler which is to be engaged first to ensure that the required movement of the shaft to engage said second coupler cannot be effected until engagement of said first coupler has been completed.

In a preferred arrangement rotation of the shaft is arranged to displace the associated coupler via a mechanical linkage and axial displacement of the shaft operates a valve mechanism to displace the associated coupler using fluid pressure acting via a fluid pressure operated actuator.

The mechanical linkage preferably includes a first shifting formation associated with the coupler, a lever engaged at one end in the first formation and provided at the other end with a second formation, the lever being pivoted intermediate its ends about an axis generally at right angles to the direction of shifting of the coupler, and selector means carried on the shaft and moveable therewith in first and second opposite directions on rotation of the shaft, said selector means engaging directly with the first formation in one axial position of the shaft so that movement of the selector means in said first and second directions moves said coupler in corresponding first and second directions, said selector means engaging said second formation in another axial position of the shaft so that movement of said selector means in first and second directions reverses the direction of movement of the coupler via the lever so that the coupler moves in said second and first directions respectively.

The present invention also provides a ratio selector mechanism for the operation of an axially shiftable ratio selector coupler, the selector mechanism being characterized by including a first shifting formation associated with the coupler, a lever engaged at one end with the first formation and provided at the other end with a second formation, the lever being pivoted intermediate its ends about an axis generally at right angles to the direction of shifting of the coupler, and selector means movable in first and second opposite directions and engagable either directly with the first formation so that movement of the selector means in said first and second directions moves said coupler in corresponding first and second directions or alternatively with said second formation so that movement of said selector means in said first and second directions reverses the direction of movement of the coupler via the lever so that the coupler moves in said second and first directions respectively.

DESCRIPTION OF THE DRAWINGS

One embodiment of the present invention as applied to a ratio selector mechanism for use in an agricultural tractor transmission will now be described, by way of example only, with reference to the accompanying drawings in which:-

BEST MODE OF CARRYING OUT THE INVENTION

Figure 1:
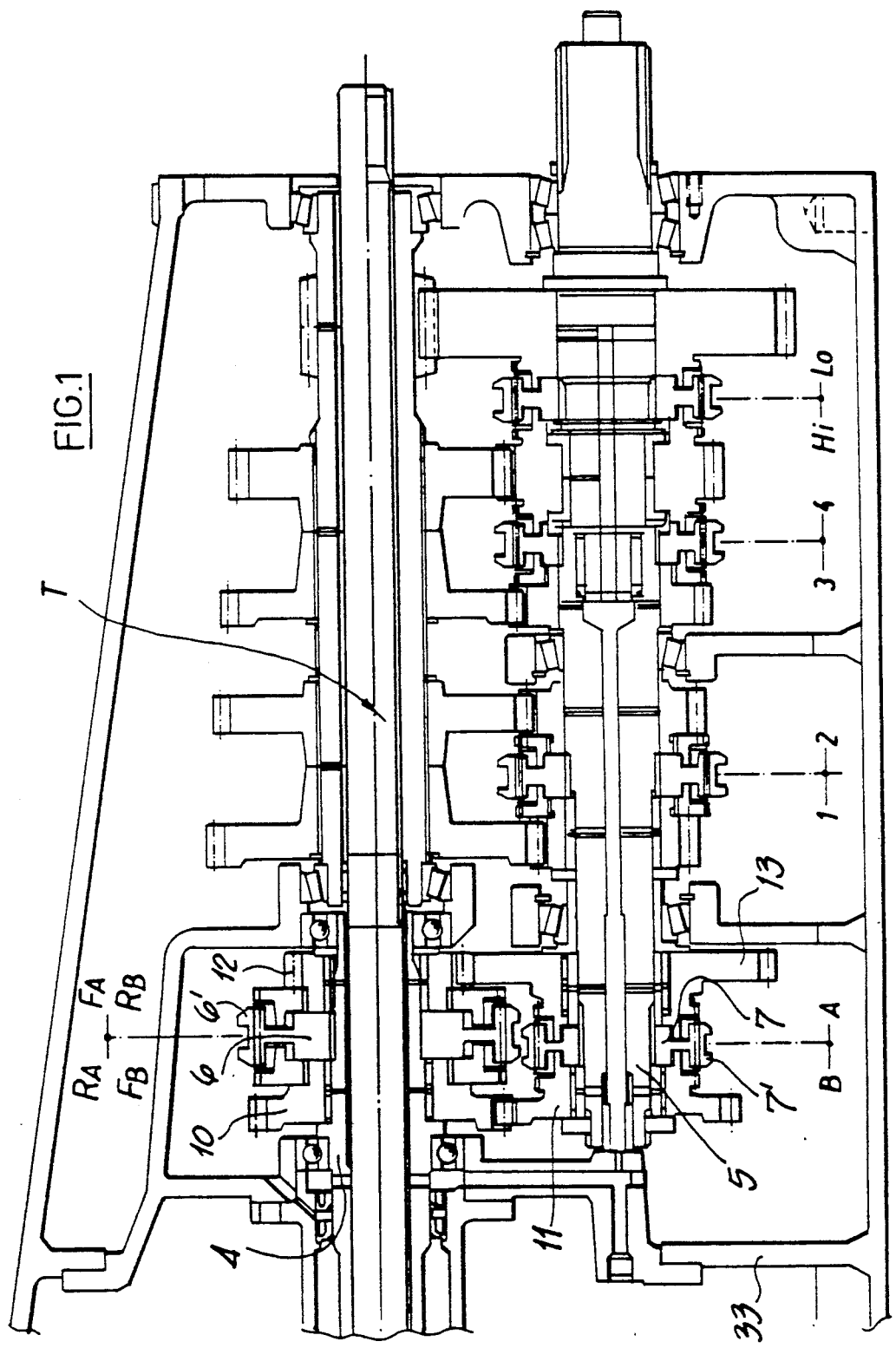
FIG. 1 is a vertical section through part of a tractor transmission.
Figures 2, 3:
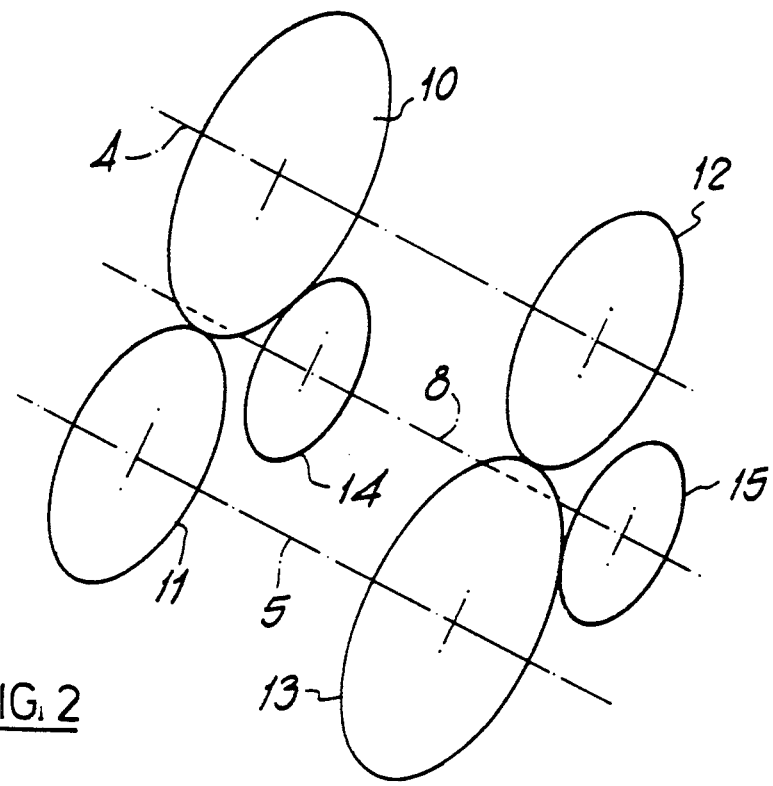
FIG. 2 is a diagrammatic representation of part of the gear wheel arrangement of the transmission shown in FIG. 1.
FIG. 3 is a table showing the gear trains used when the various ratios of the transmission of FIG. 1 are selected.

Referring to FIGS. 1 and 2 these show part of a tractor transmission having an input shaft 4 and an output shaft 5 which loosely carry train gears 10, 12 and 11, 13 respectively. These gears may be coupled to their respective shafts by synchromesh units 6 and 7 with slidable couplers 6' and 7' respectively. An idler shaft 8 is also provided (see FIG. 2) with gears 14 and 15 which rotate with shaft 8 and mesh with gears 10 and 13 respectively.

The portion of the transmission shown in FIGS. 1 and 2 provides two forward ratios FA, FB and two reverse ratios RA and RB as shown in FIG. 2 which details the gears which drive in each of the ratios provided by the transmission. As will become evident below, synchromesh unit 6 selects the forward or reverse drive direction whilst synchromesh unit 7 selects either drive range A or B for the transmission. The output shaft 5 drives into a further gearbox T providing additional ratios for the tractor.

A full description of this type of transmission and the associated gearbox is contained in the Applicant's UK Patent No. 2055162 and will not therefore be given here.

As will be evident from FIGS. 2 and 3 the forward ratio FA is obtained when the synchromesh 6' and 7' of synchromesh units 6 and 7 are both moved to the right as viewed in FIG. 1 to couple gears 12 and 13 with shafts 4 and 5 respectively. Similarly the forward ratio FB is obtained when couplers 6' and 7' are both moved to the left as viewed in FIG. 1 to couple gears 10 and 11 with shafts 4 and 5 respectively.

The reverse ratio RA is obtained when coupler 6' is moved to the left and coupler 7' is moved to the right as viewed in FIG. 1. In a similar manner the reverse ratio RB is obtained when th coupler 6' is moved to the right and the coupler 7' is moved to the left as viewed in FIG. 1.

It will be evident from the above description that the portion of the transmission shown in FIGS. 1 and 2 requires both synchromesh units to be engaged in order to provide drive from the input shaft 4 to the output shaft 5 and enables the four ratios FA, FB, RA and RB to be obtained by the appropriate operation of the two synchromesh units 6 and 7.

Figure 4:
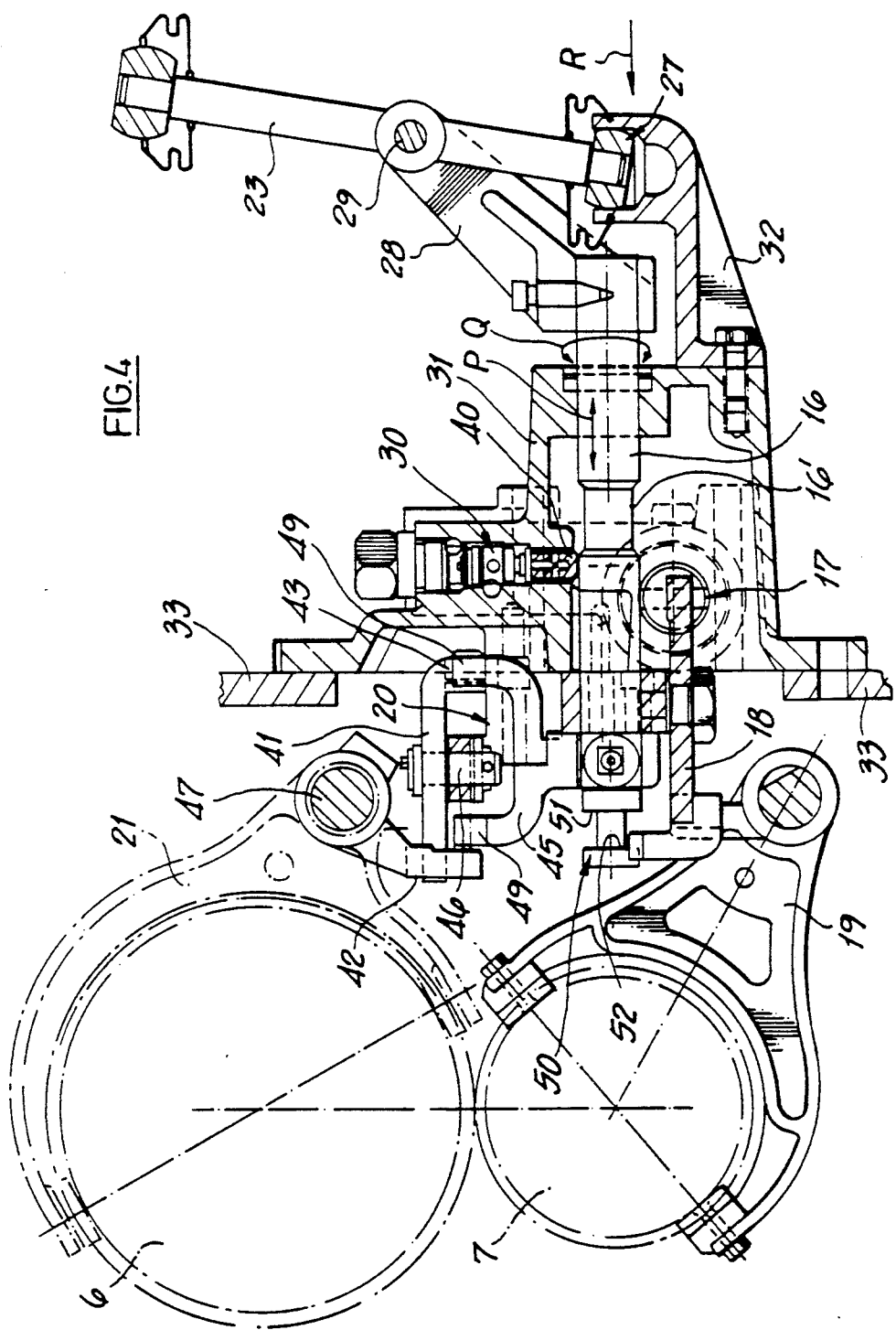
FIG. 4 is a vertical section through the ratio selector mechanism used in conjunction with the transmission of FIG. 1.

In accordance with the present invention a ratio selector mechanism for the control of synchromesh units 6 and 7 comprises a ratio selector shaft 16 which is axially movable as indicted by arrow P in FIG. 3 and also rotatable about its longitudinal axis as indicated by arrow Q in FIG. 4. As will be described below, the axial movement P is used to control the operation of an hydraulic cylinder 17 which, via a lever 18, operates a selector fork 19 which controls the coupler 7' of synchromesh unit 7. The rotation Q of shaft 16 is arranged to displace a selector fork 21 associated with synchromesh coupler 6' via a mechanical linkage 20.

Figure 6:
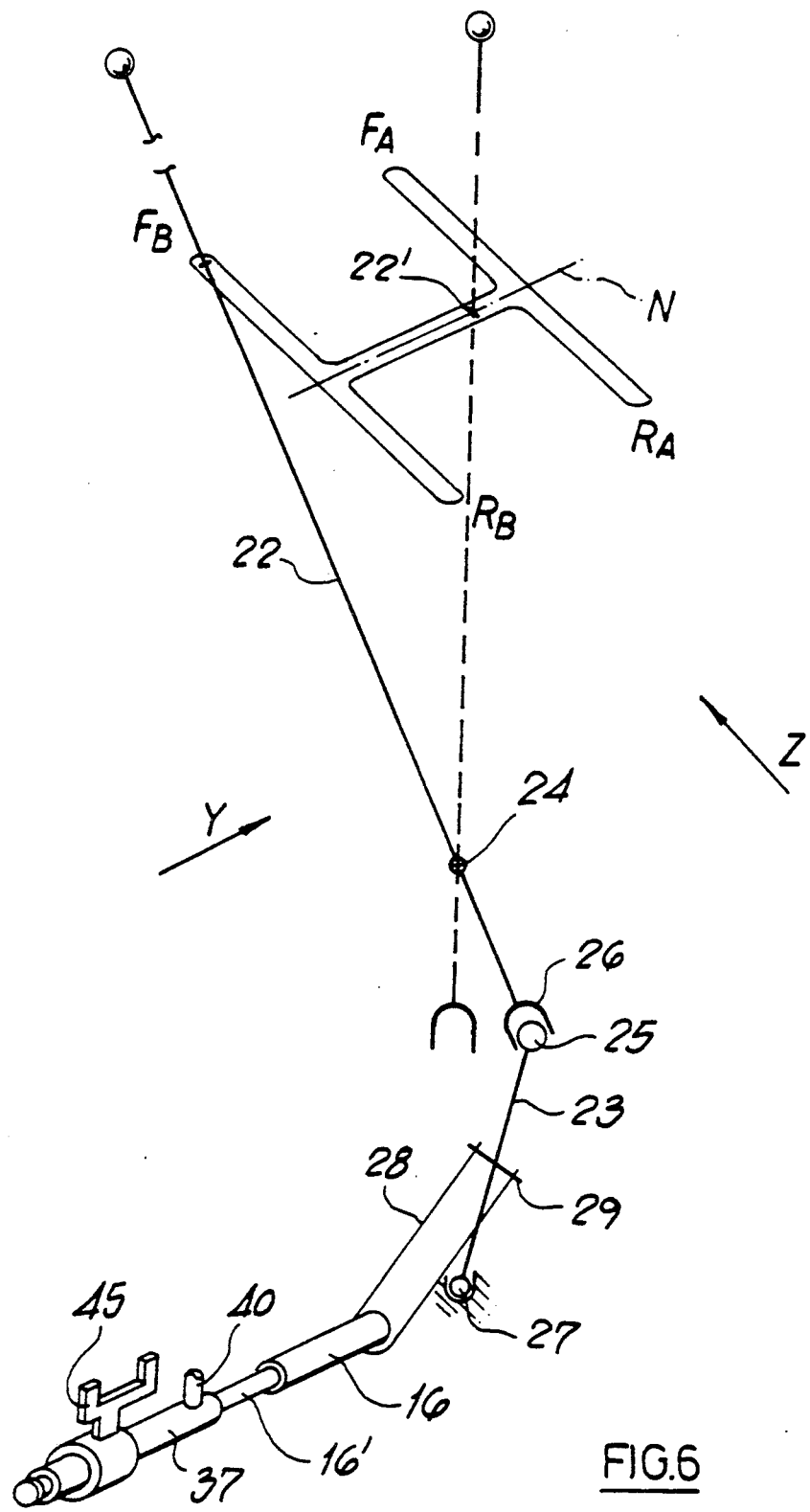
FIG. 6 is a diagrammatic representation of part of the ratio selector mechanism.

The selector shaft 16 is displaced axially in direction P and rotated in direction Q via a double lever arrangement 22, 23 of the form described and claimed in the Applicant's co-pending UK Patent Application 2136516A. As best seen in FIG. 6, the double lever arrangement comprises an upper lever 22 which is pivoted at 24 and is connected with the lower lever 23 via a ball and cup arrangement 25, 26. The lower lever 23 is pivoted at its lower end in a ball mounting 27 and interconnected with shaft 16 by fork 28 which is pivotally pinned to lever 23 at 29.

Figure 7:
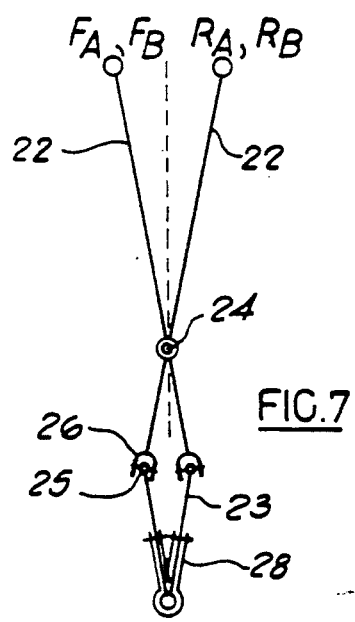
FIGS. 7 and 8 show views in directions Y and Z of FIG. 6 with the ratio selector lever shown in the four possible ratio selecting positions.
Figure 8:
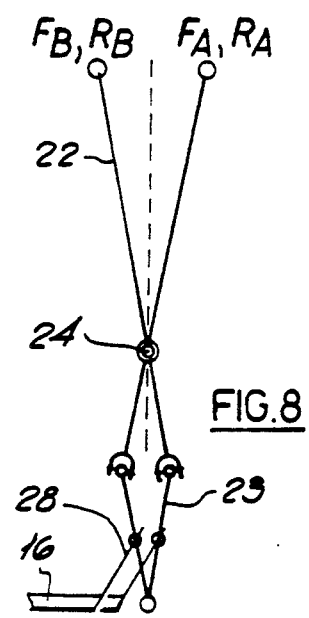

The upper lever 22 moves in a H-shaped gate shown in FIG. 6. FIGS. 7 and 8 show views in the direction of arrows Y and Z of FIG. 6 illustrating the disposition of the upper and lower levers 22 and 23 and the associated fork member 28 and shaft 16 in the four ratio selecting positions of the upper lever 22. If the reader requires a more detailed explanation of the two lever arrangements 22, 23 he is directed to the Applicants previously referred to co-pending application No. 2136516A.

The shaft 16, hydraulic cylinder 17, lower lever ball mount 27 and hydraulic valve 30 are all mounted on castings 31 and 32 which are bolted to the side of the main transmission housing 33. These castings are readily removable to give easy access to the selector mechanism for maintenance etc.

Figure 5:
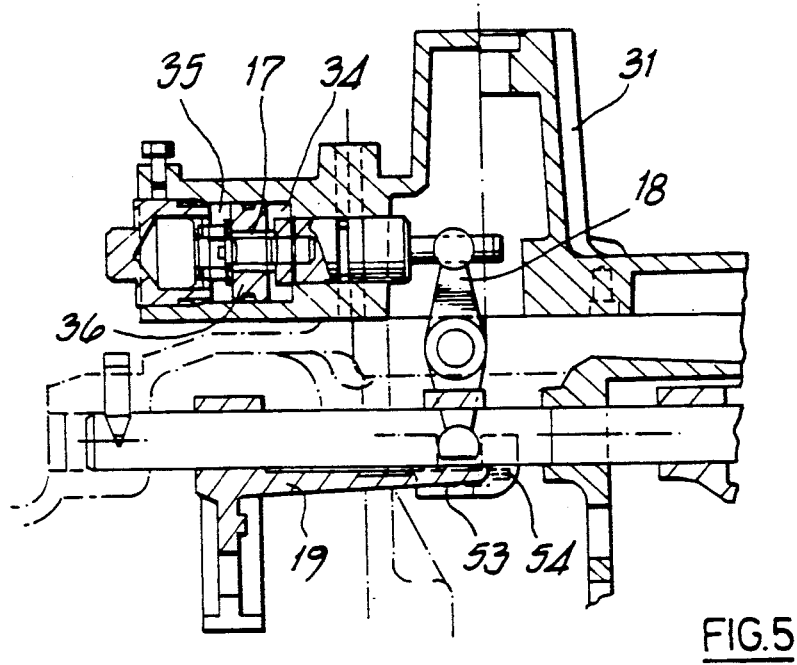
FIG. 5 is a horizontal section through part of FIG. 4.
Figure 15:
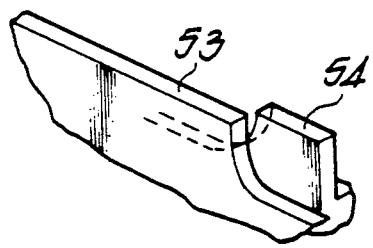

Dealing first with the control of synchromesh unit 7 from shaft 16, the hydraulic cylinder 17 includes a piston 36 which defines two chambers 34 and 35 which may be pressurised by hydraulic fluid. Chamber 34 is permanently connected to a source of hydraulic pressure by passageways and piping (not shown) so as to displace the piston 36 to the left as viewed in FIG. 5 thus moving the lever 18 in a counter clockwise direction and displacing the selector fork 19 to the right to engage range A of the transmission. In order to engage range B the chamber 35 is additionally pressurised at the same level of pressure as chamber 34 by the operation of valve 30. This moves piston 36 to the right as viewed in FIG. 5 due to the differential area effect since the left hand side of piston 36 has a larger effective area than the right hand side. Thus lever 18 is moved in a clockwise sense so that selector fork 19 is moved to the left to engage range B.

Figure 9:
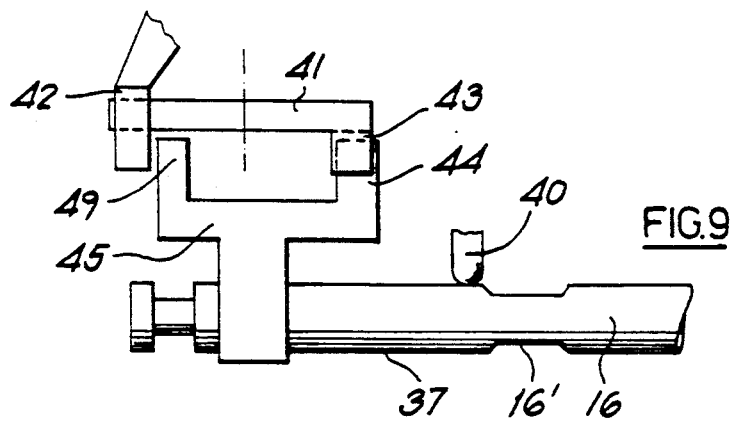
FIG. 9 and 10 are diagrammatic views of the selector mechanism in the range B and range A positions.
Figure 10:
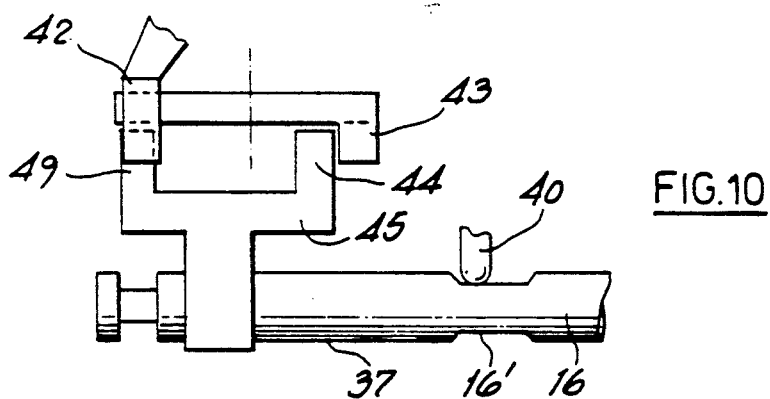

As can be seen from FIG. 4 valve 30 is operated by a cam arrangement formed in selector shaft 16. When the selector shaft is in the position shown in FIG. 9, plunger 40 is depressed by the outside diameter 37 of shaft 16 to operate valve 30 and hence connect chamber 35 to the source of pressurised fluid and hence engage range B. If the shaft 16 is displaced to the left as viewed in FIG. 10 the plunger 40 of valve 30 drops into the reduced diameter portion 16' of shaft 16 thus cutting off the supply of pressurised fluid to chamber 35 and venting the pressure in chamber 35 to the inside of casting 31 around the plunger 40 whereupon the fluid runs inside the main transmission housing 33. This allows the permanent pressure in chamber 34 to displace the piston 36 to the left and hence move the lever 18 to engage range A as described above. This sequence of movements of shaft 16 is also shown diagrammatically in FIGS. 9 and 10 which show the valve plunger 40 in its two positions.

Turning now to the control of synchromesh unit 6 and the mechanical linkage 20 which connects shaft 16 with selector fork 21 this includes a lever 41 which engages a cut-out 42 in selector fork 21. The other end of lever 41 is provided with a cut-out 43 which may receive one arm 44 of a selector member 45 which is carried by the shaft 16. The arm 41 is pivoted at 46 about an axis generally at right angles to rail 47 on which selector fork 21 slides. With the arm 44 of selector member 45 engaged in cut-out 43 rotation of shaft 16 in a clockwise sense as viewed in arrow R of FIG. 4 moves the selector fork 21 and thus synchromesh coupler 6' to the right as viewed in FIG. 1 and 2 whereas anti-clockwise rotation of shaft 16 moves the selector fork 21 and coupler 6' to the left.

If shaft 16 is axially displaced to the left as viewed in FIG. 4, so that the plunger 40 of valve 30 engages reduced diameter portion 16' of shaft 16, the other arm 49 of selector member 45 engages in cut-out 42 whilst arm 44 disengages cut-out 43. Thus in this condition clockwise rotation of shaft 16 as viewed in direction R results in movement of selector fork 21 to the left whereas anti-clockwise movement moves the selector fork 21 to the right. Thus the use of the pivoted arm 41 enables the direction of movement of the selector fork 21 for a given sense of a rotation shaft 16 to be reversed depending on whether arm 44 or 49 is engaged in the corresponding cut-out 43 and 42 as described above.

The various control movements of synchromesh units 6 and 7 described above are interlocked using a simple mechanical interlock arrangement 50 which comprises control surfaces 51 and 52 formed on the end of shaft 16 and blocking ridges 53 and 54 (see FIG. 5) formed on selector fork 19.

The operation of the interlock arrangement will now be described together with the general operation of the selector mechanism with particular reference to FIGS. 11 to 14.

With the selector mechanism in the position shown in FIGS. 4 and 6 range B is engaged and the forward direction selected so that both the synchromesh couplers 6' and 7' are moved to the left as viewed in FIG. 1.

If the operator now wishes to engage the reverse direction in range B he simply moves the lever 22 from position FB to RB shown in FIG. 6 which results in the clockwise rotation of shaft 16 as viewed in direction R which moves the synchromesh coupler 6' to the right as viewed in FIG. 1 via the pivoted lever 41. Thus the operator is able to change between the forward and the reverse directions in range B simply by operating the mechanical linkage 20. A similar situation pertains when the operator wishes to change between ratios FA and RA again only necessitating the operation of the mechanical linkage 20.

It will be appreciated that unless the operative range is changed the interlock 50 does not come into operation.

If the operator now wishes to change between the ratio FB to the ratio FA he moves the lever 22 into the neutral plane N which results in the synchromesh coupler 6' being placed in the central neutral position using the pivoted lever 41. The lever 22 is then moved across the gate in the neutral plane N and this movement results in the axial displacement P of the shaft 16 so that the plunger 40 of valve 30 now makes contact with the reduced diameter portion 16' of shaft 16. As described above this initiates the operation of hydraulic cylinder 17 to begin the movement of selector fork 19 and associated coupler 7' to the right as viewed in FIG. 1.

Figure 11:
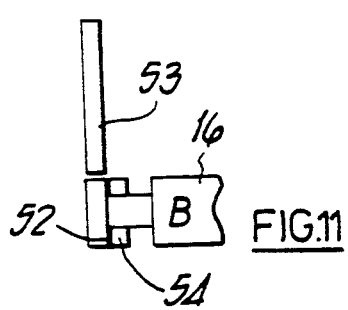
FIGS. 11, 12, 13 and 14 show various views of an interlock arrangement used to control the movement of a selector rod of the mechanism, and FIG. 15 show a fragmentary view of part of the interlock arrangement of FIGS. 11 to 14.
Figure 12:
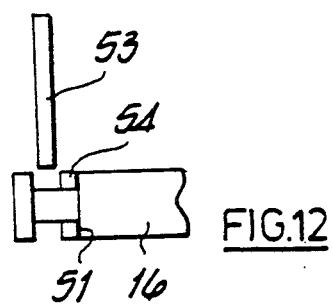

FIG. 11 shows the interlock 50 in the range B position in which control surface 52 abuts the left hand face of ridge 54. When a change is initiated to range A the shaft 16 initially moves to the position shown in FIG. 12 whereupon control surface 51 abuts the right hand face of ridge 54. With the shaft 16 in the position shown in the FIG. 12 the arms 44 and 49 of selector member 45 are engaged in formations 43 and 42 respectively so that pivoting of lever 41 is not possible thus preventing the commencment of the actuation of synchromesh unit 6. When the movement of selector fork 19 to the right has been completed to engage the range A gear the ridge 54 moves out of the path of travel of control surface 51 so that the shaft 16 can now complete its movement to the right to occupy the position shown in FIG. 13. As will be appreciated this final movement of the shaft 16 to the right disengages arm 44 from cut-out 43 and fully engages arm 49 with cut-out 42 (see FIG. 10) so that the actuation of synchromesh unit 16 can now be completed by the movement of the lever 22 out of the neutral plane N towards the selection position FA. This results in the displacement of the synchromesh coupler 6' to the right as viewed in FIG. 1.

If the movement of selector lever 22 from position FB along neutral plane N towards selection position FA is undertaken relatively slowly the operator will be unaware of the operation of the interlock 50. However, if the operator moves lever 22 extremely quickly he will experience a momentary checking of lever 22 at a position in neutral plane N (say position 22') until the locking ridge 54 has moved to the FIG. 13 position allowing the further movement of shaft 16 to be completed.

Figure 13:
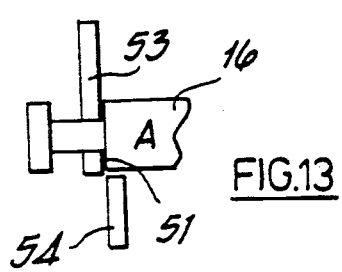
Figure 14:
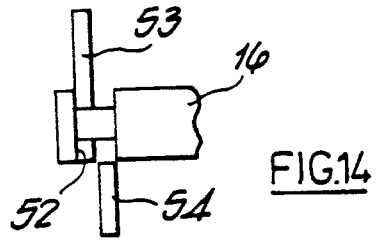

It will be evident to those skilled in the art that if the operator wishes to change from range A to range B the shaft 16 is initially moved from the FIG. 13 position to the FIG. 14 position but cannot complete its movement to the right in view of the position of ridge 53. Again when the movement of selector fork 19 has been completed to engage range B the ridge 53 will occupy the position shown in FIG. 11 allowing the shaft 16 to complete its movement to the right and occupy the position shown in FIG. 11.

The interlock 50 thus has a number of functions. For example, it ensures that the engagement of synchromesh unit 7 is always completed before engagement of synchromesh unit 6 can be attempted and it also ensures that the synchromesh coupler 7' must either occupy the Range A position or range B position and cannot be left in a neutral position. The neutral condition for the transmission is obtained when the lever 22 is in the neutral plane N and the lever 41 has moved the synchromesh coupler 6' to its intermediate neutral position.

It will be observed that the diameter (and thus the torque handling capacity) of synchromesh unit 6 is appreciably larger than unit 7. This is possible because unit 7 is always arranged to be engaged first and only has to overcome the relatively low rotational inertia of the gears shown in FIG. 2 since the higher inertia items such as the input shaft 4 and the main drive clutch (not shown) have not at that time been coupled by synchromesh unit 6. This use of a smaller diameter synchromesh unit 7 results in a significant cost saving and enables shafts 4 and 5 to be closer together giving a more compact transmission.

I claim:

1. A transmission ratio selector mechanism for a transmission having two ratio selector couplers both of which must be engaged to provide drive through the transmission, the mechanism comprising a selector shaft rotatable about its longitudinal axis and axially displaceable parallel to its longitudinal axis, a mechanical linkage connected between the shaft and a first of the couplers, and a fluid pressure actuator connected with a second coupler and controlled by a valve mechanism which is operated by movements of the shaft, whereby rotation of the shaft engages one of the couplers and axial displacement of the shaft engages the other coupler.

2. A selector mechanism according to claim 1 in which the valve mechanism is operated by a cam formation on the shaft.

3. A selector according to claim 1 in which the mechanical linkage comprises a first shifting formation associated with the first coupler, a lever engaged at one end with a second formation, the lever being pivoted intermediate its ends about an axis generally at right angles to the direction of shifting of the first coupler, and selector means carried on the shaft and movable therewith in first and second opposite directions on rotation of the shaft, said selector means engaging directly with the first formation in one axial position of the shaft whereby movement of the selector means in said first and second directions moves the first coupler in corresponding first and second directions, and said selector means engaging said second formation in another axial position of the shaft whereby movement of the selector means in said first and second directions reverses the direction of movement of the first coupler via the lever so that the first coupler moves in said second and first directions respectively.

4. A transmission ratio selector mechanism for a transmission having two ratio selector couplers both of which must be engaged to provide drive through the transmission, the mechanism comprising a selector shaft rotatable about its longitudinal axis to engage one coupler and axially displaceable parallel to its longitudinal axis, to engage the other coupler, and interlock means to ensure that during any ratio change involving the engaging of both couplers a first of the couplers is always engaged before a second of the couplers, the interlock means comprising a formation movable with the shaft which co-operates with a formation movable with the coupler which is to be engaged first, whereby the required movement of the shaft to engage said second of the couplers cannot be affected until engagement of said first coupler has been completed.

5. A transmission ratio selector mechanism for the operation of an axially shiftable ratio selector coupler, the selector mechanism including a first shifting formation associated with the coupler, a lever engaged at one end with the first formation and provided at the other end with a second formation, the lever being pivoted intermediate its ends about an axis generally at right angles to the direction of shifting of the coupler, and selector means movable in first and second opposite directions and engageable either directly with the first formation whereby movement of the selector means in said first and second directions moves said coupler in corresponding first and second directions or alternatively with said second formation whereby movement of said selector means in said first and second directions reverses the direction of movement of the coupler via the lever to move the coupler in said second and first directions respectively.

* * * * *